(12) United States Patent
Muehlpforte et al.

(10) Patent No.: US 6,367,870 B1
(45) Date of Patent: Apr. 9, 2002

(54) WIPER ARRANGEMENT

(75) Inventors: Kurt Muehlpforte; Jan Dietrich; Henk Becker; Claus Fleischer, all of Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/194,162
(22) PCT Filed: Feb. 12, 1998
(86) PCT No.: PCT/DE98/00392
  § 371 Date: Oct. 4, 1999
  § 102(e) Date: Oct. 4, 1999
(87) PCT Pub. No.: WO98/42549
  PCT Pub. Date: Oct. 1, 1998

(30) Foreign Application Priority Data

Mar. 22, 1997 (DE) .......................................... 197 12 113

(51) Int. Cl.⁷ .................................................. B60J 7/00
(52) U.S. Cl. ................. 296/192; 15/250.16; 248/316.6; 248/230.5

(58) Field of Search ........................... 15/230.31, 250.3; 296/192, 96.17; 248/316.5, 230.4, 231.51, 230.5, 230.3, 231.61, 231.41, 316.6, 316.4

(56) References Cited

U.S. PATENT DOCUMENTS

| 4,938,526 | A | * | 7/1990 | Sannomiya et al. | ........ 296/192 |
| 5,068,500 | A | * | 11/1991 | Kitada | ........ 200/19 R |
| 5,396,681 | A | * | 3/1995 | Hara | ........ 15/250.31 |
| 5,593,125 | A | * | 1/1997 | Storz et al. | ........ 248/316.5 |

FOREIGN PATENT DOCUMENTS

EP          0 409 944 B1    5/1993

* cited by examiner

*Primary Examiner*—Anita King
*Assistant Examiner*—Gwendolyn Baxter
(74) *Attorney, Agent, or Firm*—Michael J. Striker

(57) ABSTRACT

A wiper system has a wiper motor and a gear secured via a receptacle to a tubular carrier by fastening regions formed onto its gear box, and the receptacle surrounds the tubular carrier in form- and/or force-locking fashion.

10 Claims, 5 Drawing Sheets

WIPER ARRANGEMENT

BACKGROUND OF THE INVENTION

The invention is based on a wiper system as.

Wiper systems, especially for motor vehicles, are secured to the motor vehicle body and substantially comprise a wiper drive, which via a drive shaft and rod linkage drives power takeoff shafts, which are supported in wiper bearings that protrude from the vehicle body and onto which wipers are placed.

The wiper drive comprises a wiper motor and a gear, whose gearbox has a bearing support, in which an outward-protruding drive shaft is guided. The wiper drive must be fixed in the axial and circumferential directions so that the reaction forces of the torque to be transmitted and the forces of gravity can be absorbed. From European Patent Disclosure EP 409 944 B1, a wiper system is known that is secured by a receptacle for the wiper drive to the body of the motor vehicle. The wiper drive is connected to the receptacle via three threaded joint legs disposed in a triangle about the bearing support, or else is integrally formed onto the gearbox. The receptacle is adjoined at the side by tubular carriers for the wiper bearings. They are slipped onto projections and form-lockingly joined to them, preferably by being snapped into recesses. The snap placement creates an inseparable connection. In wiper systems with two wiper bearings, two tubular carriers are also needed, which are joined to the receptacle or the gearbox via two interfaces.

A wiper system with a tubular carrier on which two wiper bearings can be secured is also known from the prior art. The receptacle for the wiper drive is welded to the tubular carrier. The wiper drive is secured in turn to the receptacle with three threaded joint legs disposed in a triangle about the bearing support.

SUMMARY OF THE INVENTION

The embodiment according to the invention as has the advantage that two wiper bearings can be disposed on one tubular carrier, so that the receptacle is connected form- and/or force-lockingly to the tubular carrier by only one interface. The result is attained is lightweight, compact connections which in most versions are at the same time separable again, and which can be monitored economically and easily. The materials are joined together without the addition of heat, so that any hardening, changes in the microstructure, or embrittlement that might be caused thereby are precluded. Materials of different kinds can be easily joined to one another. The parts can be mounted using simple tools.

In addition, reject parts are reduced, because the connection can be undone again to correct assembly errors or for replacement of defective parts. One receptacle can be used for different tubular carriers, and the wiper system can be adapted to different built-in variations, in that the receptacle is slipped onto the tubular carrier and/or rotated about angular ranges that are specified by the form-locking contour.

In the automotive industry, economizing a weight with the attendant fuel savings are especially important today. Even slight economies in many small individual components are important, because they reduce the total weight considerably directly as well as indirectly by smaller dimensioning of the adjoining components. According to the invention, the tubular carrier is made by an internal high-pressure process (IHV), and as a result it can be made hollow, stiff, relatively thin-walled, and thus especially light in weight.

In principle, both a purely form-locking and a purely force-locking connection are conceivable. Preferably, however, the two types of connection are used in combination, so that on the one hand strong forces and moments can be absorbed by the form lock and on the other freedom in terms of play can be attained because of the force lock. According to the invention, the form lock is attained in the circumferential direction with a nonround form of the tubular carrier and a suitable outer contour of the receptacle, such as a contour other than the circular, such as polygonal or in some other way, regular or irregular, elliptical, or with sets of teeth. In the longitudinal direction, a force-locking connection often suffices. If major forces must be absorbed in the longitudinal direction as well, however, then a form lock can additionally be attained by means of a contour, dimension or orientation of the tubular carrier that varies in the longitudinal direction.

A further contribution to a compact, lightweight mode of construction is made by a receptacle that is formed entirely or in part onto the gearbox. Interfaces, individual parts, and thus assembly effort and expense as well as weight can thus be reduced.

Simple assembly is especially important in large-scale production. Simple assembly is attained according to the invention with a tubular carrier that is placed in an indentation in the receptacle in form-locking fashion in the longitudinal direction and/or the circumferential direction and then fixed force-lockingly with a clip that closes the indentation. In special cases, for instance under heavy load, an additional form-locking connection between the clip and the tubular carrier may be appropriate.

If an indentation is formed in part or entirely by one or more fastening regions of the gearbox that are embodied as threaded joint legs, and if the screw thereof is used for the force lock with the clip, then existing components are assigned additional functions, while additional components are avoided, thus saving weight and space. A further contribution in this respect is made by a clip screwed onto only one side which on the other side is suspended form-lockingly from the gearbox or the receptacle. A clip of this kind can be installed and removed quickly.

The number of interfaces can also be reduced by means of receptacles formed entirely on the gearbox. In a feature of the invention, this is attained with receiving faces that are formed onto the feet of what are preferably two threaded joint legs. The tubular carrier is fixed force-lockingly, and possibly form-lockingly as well, in the receiving faces. To this end, it has openings or stepped bores through which the threaded joint legs are inserted. The force lock is created with the screws of the threaded joint legs with which the tubular carrier is pressed into the receiving faces. The result is a very compact, lightweight construction with only a few components. To distribute the clamping force uniformly over the tubular carrier and to attain good guidance, a reinforcing shell may be placed between the screws and the tubular carrier. In particular, the clamping force can be better distributed and advantageous centering can be attained without any additional element, by forming conical supports onto the tubular carrier, preferably by means of an internal high-pressure process, the supports then form-lockingly adjoining suitably shaped threaded joint legs. Formed-on supports can also be utilized to center the tubular carrier in the receiving faces. Better guidance and force distribution can also be attained with a larger pitch circle of the threaded joint legs, because then the spacing between the force introduction points is increases.

It is often advantageous for work operations to be integrated into existing method steps in manufacture. This allows a considerable reduction in the effort and expense of assembly and in the number of interfaces. According to the invention, this is achieved with an internal high-pressure process. To that end, a stamped/bent component which has shells placed high and low is preferably used as the receptacle. A still round tubular carrier is thrust through the shells and then placed in an internal high-pressure-process tool with the receptacle. The tubular carrier is then acted upon by pressure, which causes it to pressure together with the shells against the inner wall of the internal high-pressure-process tool. The inner wall is preferably nonround, so that a form lock is attained in the circumferential direction between the receptacle and the tubular carrier. The shells can be preshaped in nonround fashion from the outset, to suit the inner contour of the internal high-pressure-process tool. Preferably, they are preshaped enough that by means of a joint deforming operation a durable form- and force-locking connection is created between the tubular carrier and the shells, without having to employ excessive forces, because of the accumulation of material.

BRIEF DESCRIPTION OF THE DRAWING

In the drawing, exemplary embodiments of the invention are shown. The description and the claims contain numerous characteristics in conjunction with one another. One skilled in the art will expediently also consider the characteristics individually and make further appropriate combinations of them.

Shown are.

DESCRIPTION OF THE PREFFERED EMBODIMENTS

Figure 1:
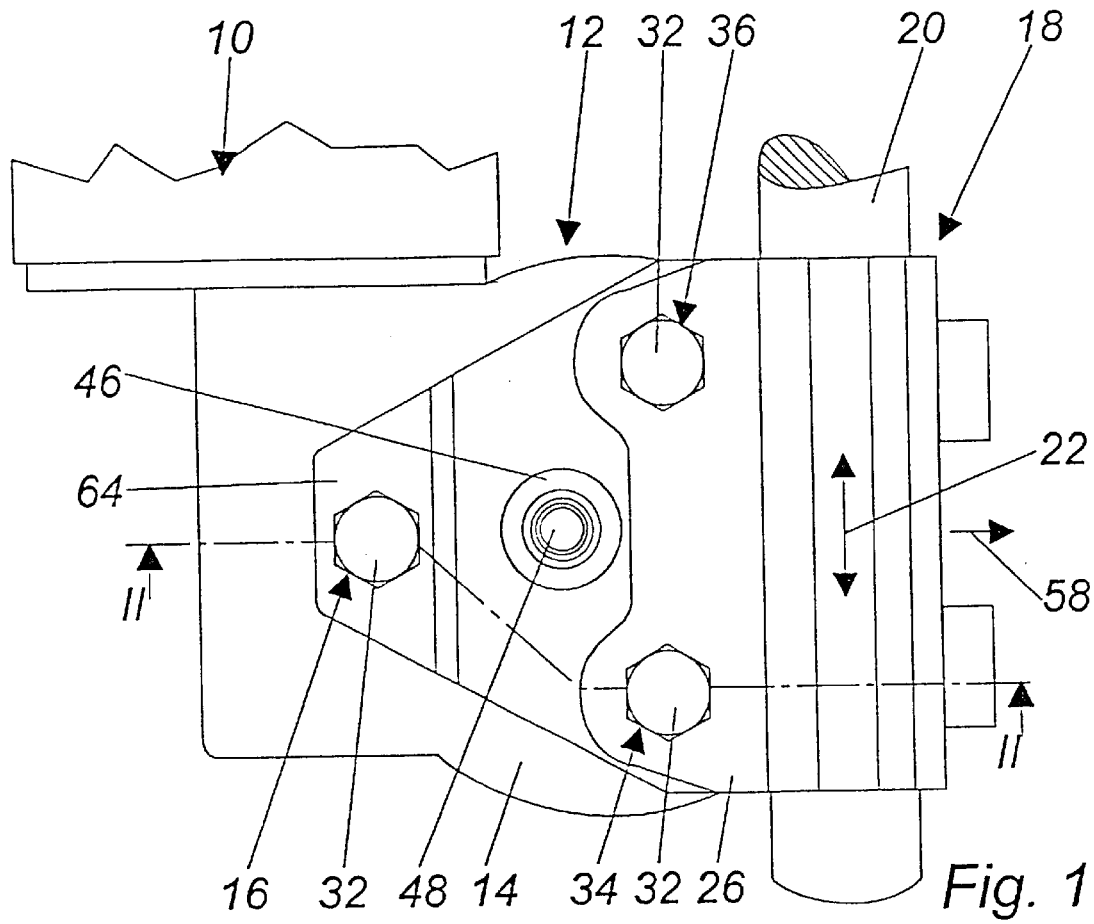
FIG. 1, a view from above of a wiper system with a receptacle.
Figure 2:
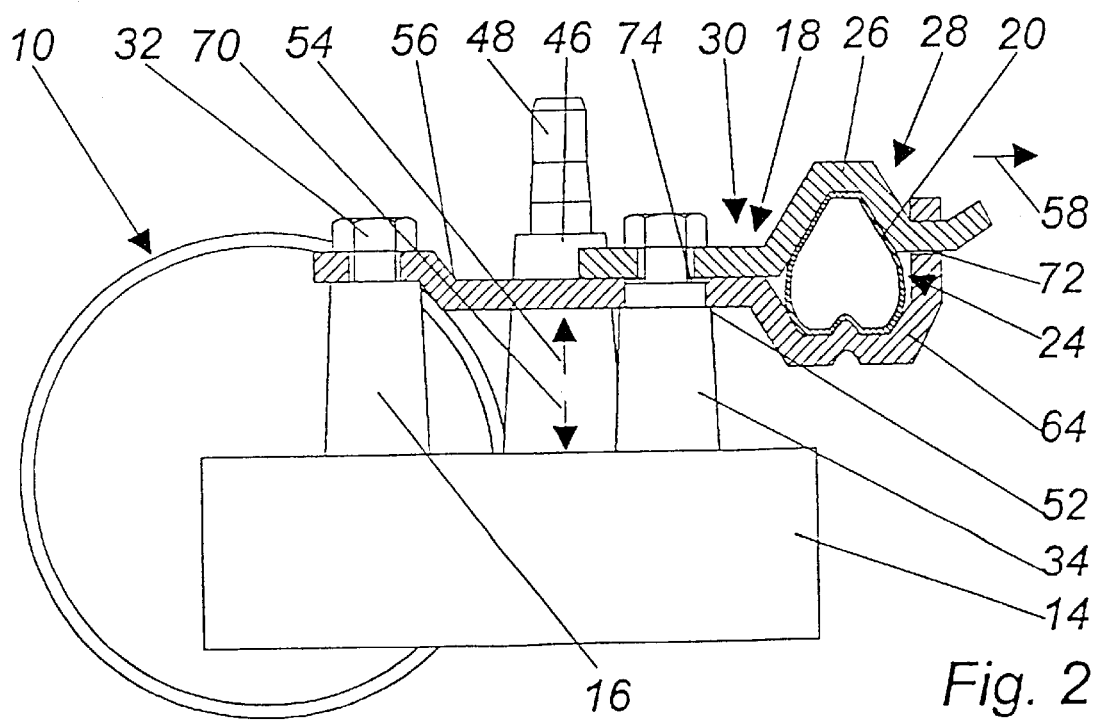
FIG. 2, a sectional view taken along the line II—II of FIG. 1.

In FIGS. 1 and 2, a wiper system is shown, with a wiper motor 10 and with a gear 12 whose gearbox 14 has a bearing support 46, in which an outward-protruding drive shaft 48 is guided, around which three fastening regions 16, 34, 36, embodied as threaded joint legs 16, 34, 36, are arranged in a triangle, offset from one another by 120° each. The gearbox 14 is connected to a tubular carrier 20 (FIG. 2) via a receptacle 18 comprising two clips 64, 26. Preferably, two threaded joint legs 34, 36 are disposed side by side in the direction 58 of the tubular carrier 20 and parallel to the tubular carrier. The first clip 64 in the receptacle 18 is placed onto the threaded joint legs 16, 34, 36. It is screwed with a screw 32 to one threaded joint leg 16, which is preferably the one farthest away from the tubular carrier 20 as compared to the other threaded joint legs 34, 36. The tubular carrier 20 is then form-lockingly placed in the circumferential direction and/or the longitudinal direction 22 in a channel-shaped indentation. This can be achieved for instance with sets of teeth or other kinds of non-round profiling. Especially in the longitudinal direction 22, a form lock by means of a contour, dimension or orientation of tubular carrier 20 that varies in this direction is conceivable, for instance in that the tubular carrier is deformed crosswise to the longitudinal direction 22 where it adjoins the clips 26, 64.

The indentation 24 is then closed with the second clip 26, in that this clip is suspended in form-locking fashion, on the side 28 pointing away from the gear 12, in the first clip 64, as shown for instance in FIG. 2, in an opening 72 extending in the longitudinal direction 22. On the opposite 30 of the tubular carrier 20, the clip 26 is screwed to two threaded joint legs 34, 36 disposed parallel to the tubular carrier 20. The clip 26 is braced against the tubular carrier 20, possibly even in form-locking fashion, and as a result when the clip 26 is screwed on a clamping force on the tubular carrier 20 is created. The tubular carrier is thus fixed in form- and force-locking fashion in the indentation 24. The clips 26, 64 extend at least across the spacing between the two threaded joint legs 34, 36 located in the direction 58, and as a result, given a distributed clamping force, good guidance is attained without critical pressure per unit of surface area.

The threaded joint legs 16, 34, 36, including their screws 32, advantageously end in the same plane in the direction 54 of the drive shaft 48, so that a rod linkage to be secured to the drive shaft 48 can move freely without having to be adapted to threaded joint legs 16, 34, 36 protruding any farther outward. This is attained for instance with a clip 64 (FIG. 2) that in the direction 58 has a shoulder 56 extending in the region 70 toward the gearbox 14 and that rests on bearing faces 52, offset in the direction 70, on the threaded joint legs 34, 36 disposed side by side and parallel to the tubular carrier 20. The height of the shoulder is approximately equivalent to the thickness of the second clip 26, so that the upper edges of the screws 32 are located virtually in the same plane. The flow of force between the two clips 26, 64 becomes favorable when these clips are pressed against one another. This is attained for instance with threaded joint legs 34, 36 in which the spacing between the bearing face 52 and the end face 74 is less than the thickness of the first clip 64, and thus the clips 26, 64 come into mutual contact as a result of the screwing operation.

Figure 3:
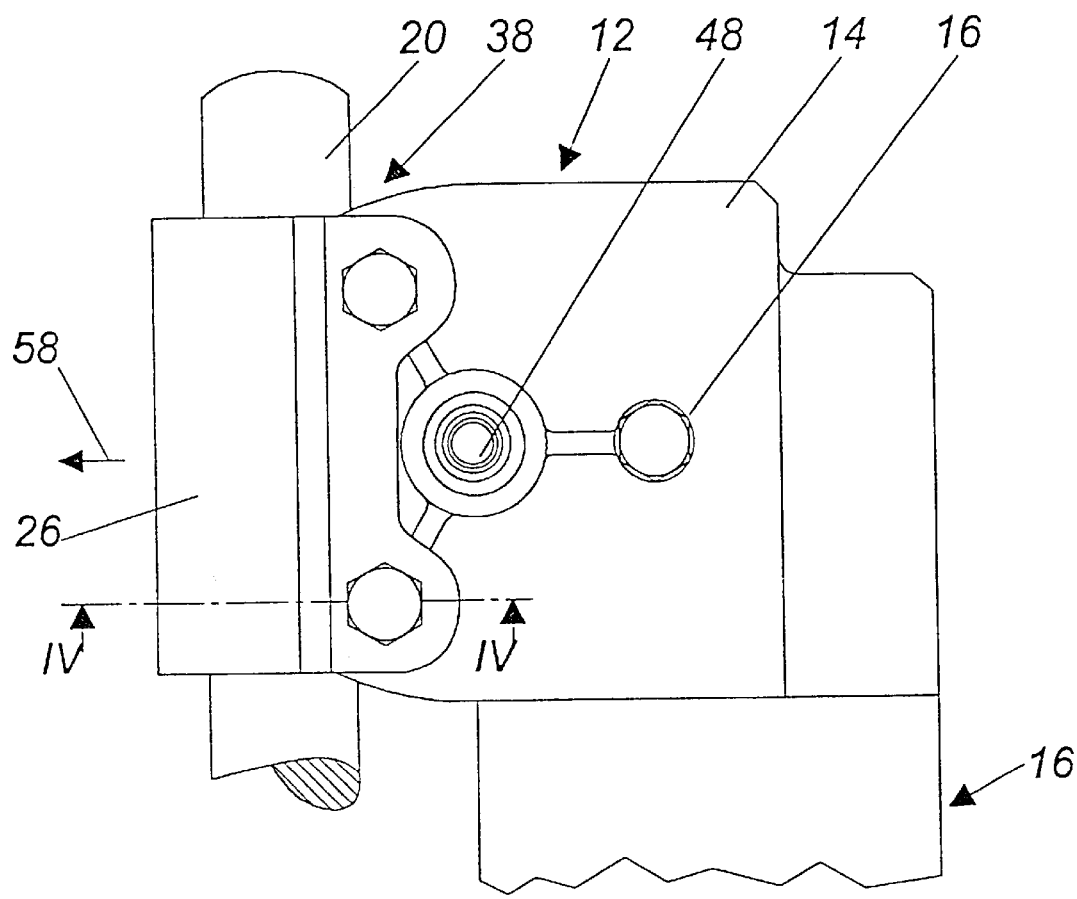
FIG. 3, a view of a wiper drive with a partly formed-on receptacle.
Figure 4:
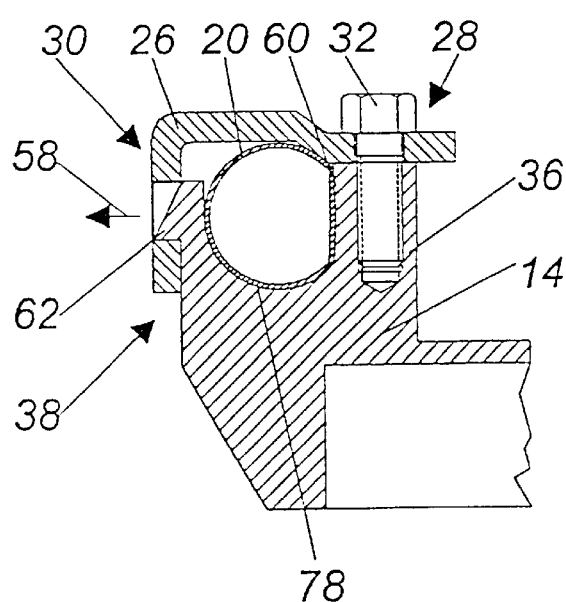
FIG. 4, a sectional view taken along the line IV—IV of FIG. 3.

In FIGS. 3 and 4, a wiper system with a receptacle 38 partly formed onto the gearbox 14 is shown. The gearbox 14 has three threaded joint legs 16, 34, 36, which again are arranged in a triangle around the drive shaft 48. The first clip 64 is replaced by an indentation 78 formed onto the gearbox 14. A wall 60 of the indentation 78 is formed by two threaded joint legs 34, 36, which can be shaped suitably for this purpose. The tubular carrier 20 and the indentation 78 have complementary outer contours, so that the tubular carrier 20 can be placed formed-lockingly into the indentation 78. The tubular carrier 20 preferably has a rounded outer contour and is flattened in the direction of the threaded joint legs 34, 36, so that it comes into contact with them in form-locking fashion. Form-locking connections as in the exemplary embodiment of FIGS. 1 and 2 are also conceivable.

By means of a clip 26, the tubular carrier 20 is pressed force-lockingly into the indentation 78. The clip is suspended on one side 28, extending in the direction 58 from the tubular carrier 20, from a protrusion 62 in the gearbox 14, so that the clip can absorb the reaction forces of the clamping force. On the opposite side 30, the clip 26 is screwed to the gearbox 14 by the screws 32, as a result of which the clamping force is introduced. The clip 26 extends over virtually the entire width of the gear 12, and as a result good guidance with distributed pressure per unit of surface area is attained.

Figure 5:
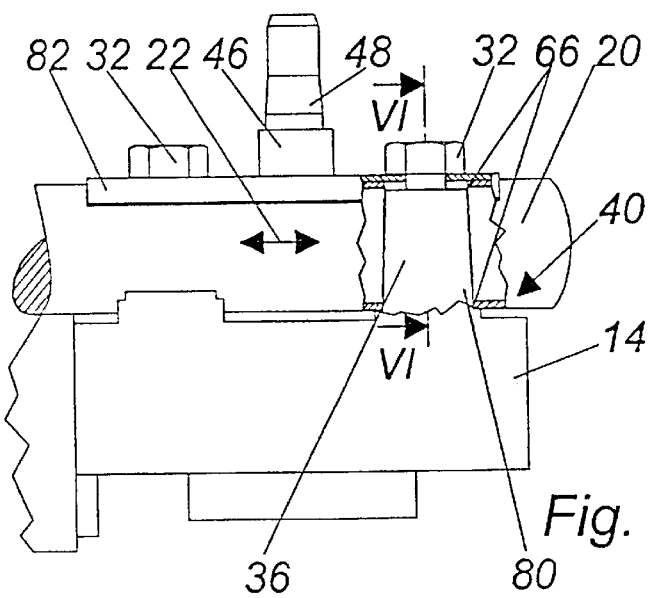
FIG. 5, a wiper system with the receptacle formed on completely.
Figure 6:
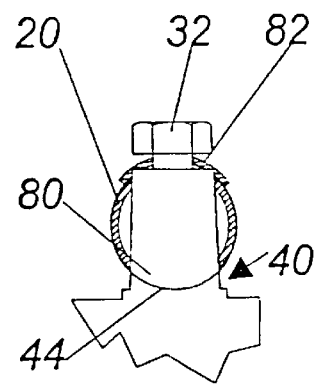
FIG. 6, a sectional view through the tubular carrier taken along the line VI—VI of FIG. 5.
Figure 7:
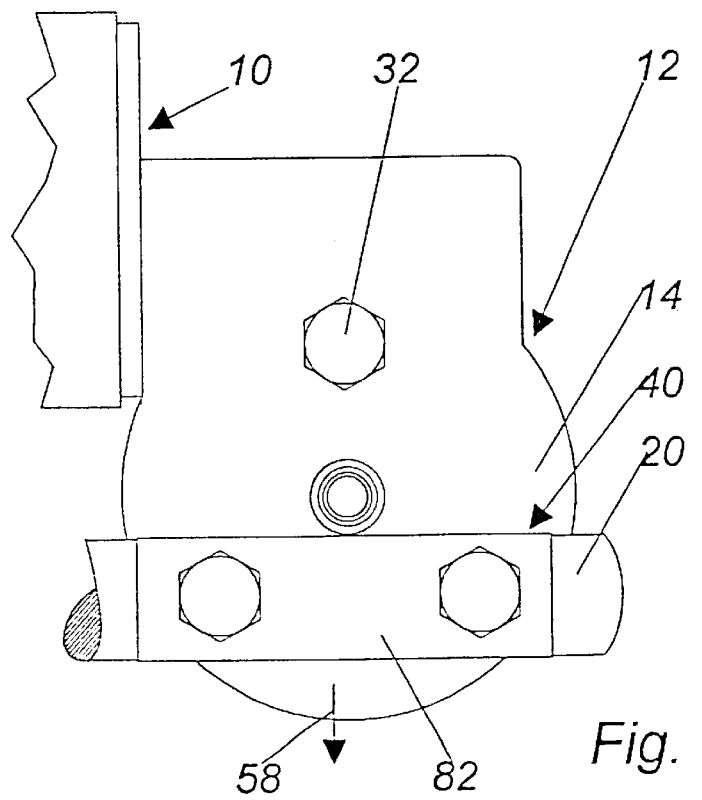
FIG. 7, a view plan view of FIG. 6.

In FIGS. 5–7, a feature of the invention with a receptacle 40 formed completely onto the gearbox 14 is shown. Receiving faces 44 (see FIG. 6) are formed onto feet 80 of the threaded joint legs 34, 36, which are disposed parallel to the carrier 20 and have a contour corresponding to the outer contour of the tubular carrier 20. The tubular carrier 20 has two stepped bores 66, so that it can be placed in the receiving faces 44 with the threaded joint legs 34, 36 reaching through it. Next, the tubular carrier 20 is fixed in force-locking fashion in the receiving faces 44 by means of the screws 32. Preferably, the receiving faces 44 and the tubular carrier 20 are joined together in form-locking fashion, in addition to the force lock. This can be attained once again in both the longitudinal direction 22 and their circumferential direction analogously to the connections described above. With a reinforcing shell 82 disposed between the screws 32 and the tubular carrier 20, the clamping force is distributed over a larger area on the tubular carrier 20. This prevents critical pressures per unit of surface area.

Figure 8:
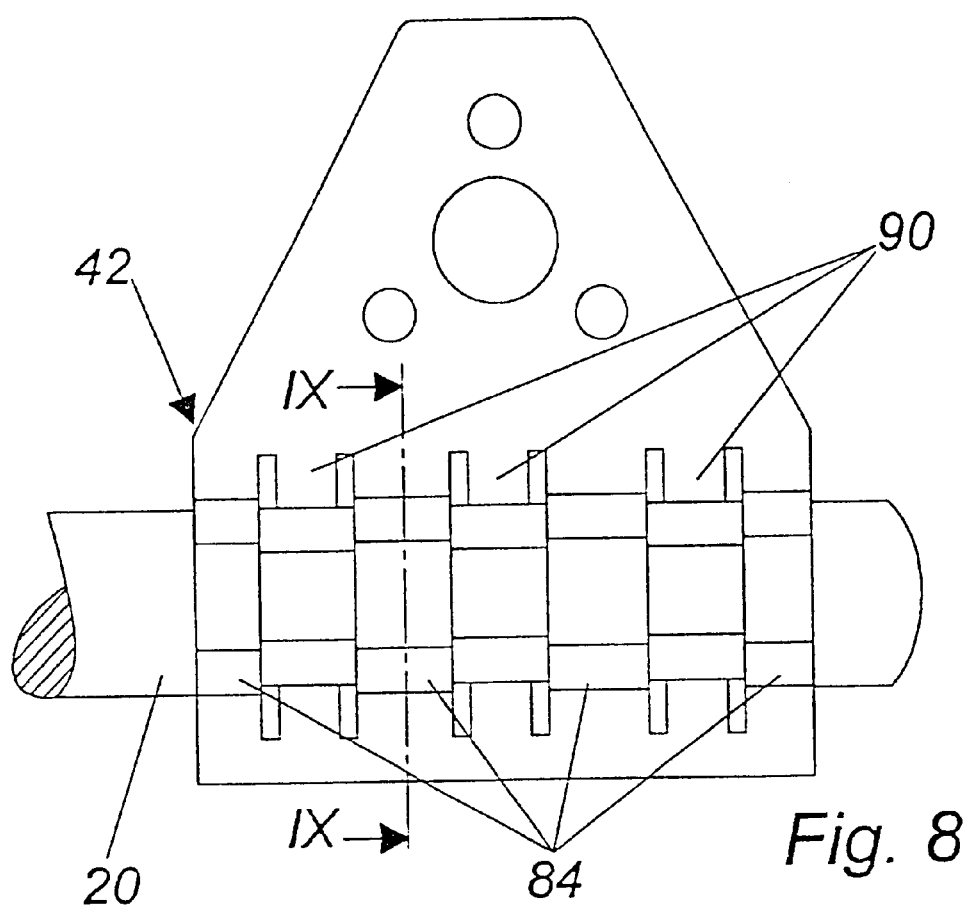
FIG. 8, a view of a wiper system with a bed board with shelves place high and low.
Figure 9:
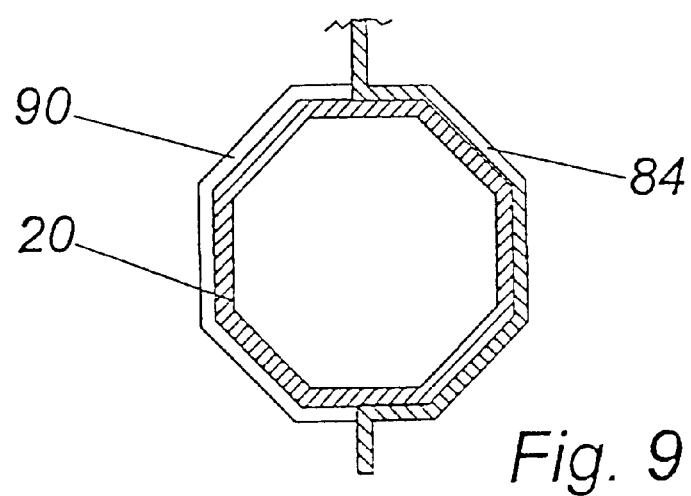
FIG. 9, a sectional view taken along the line IX—IX of FIG. 8.
Figure 10:
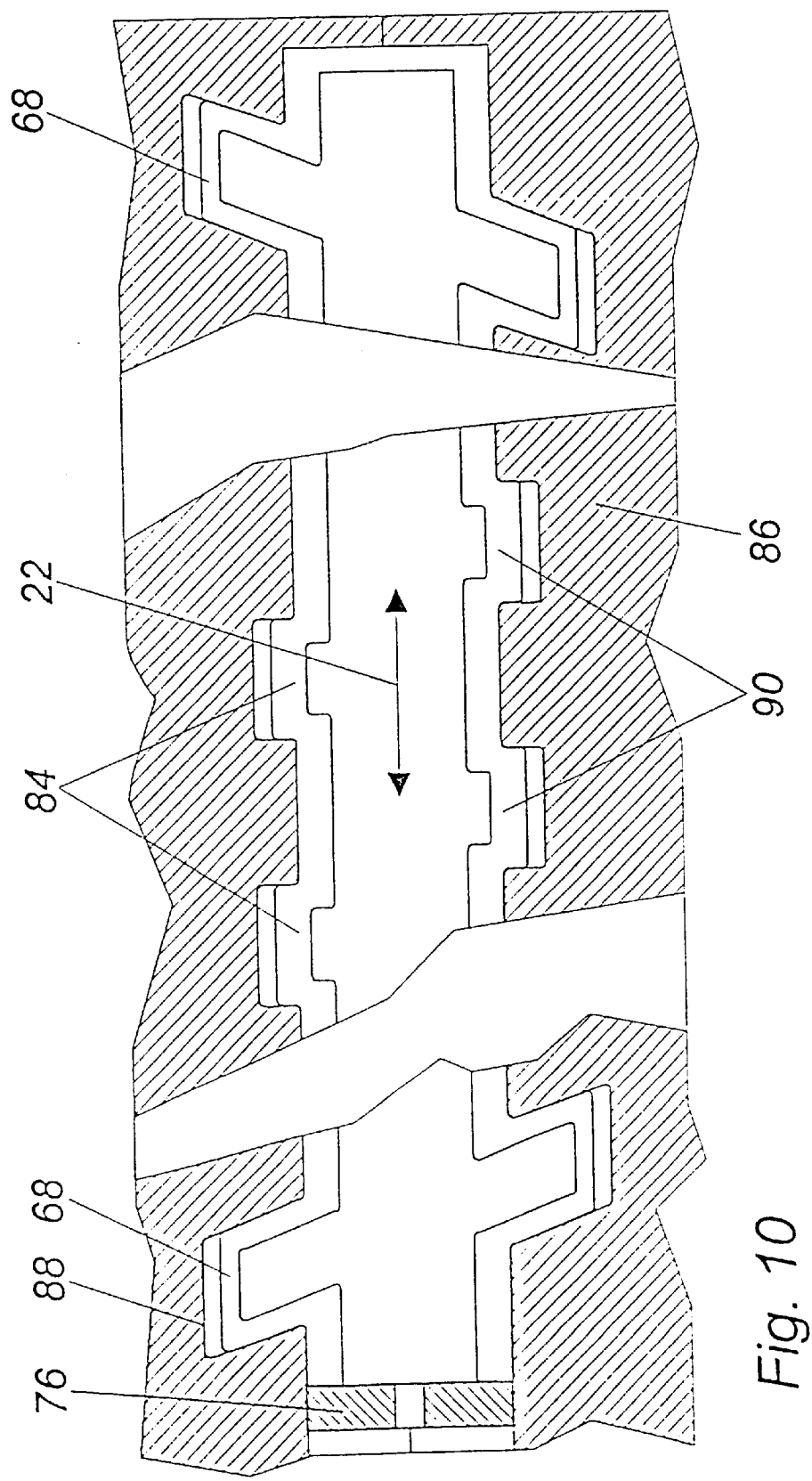
FIG. 10, the tubular carrier and the receptacle of FIG. 8, in an internal high-pressure-process tool.

In FIGS. 8–10, a variant of a wiper system is shown, with a receptacle 42 reshaped jointly with the tubular carrier 20. The receptacle 42 comprises a one-piece bed board with shells 84, 90 protruding in alternation to one side or the other and made by a stamping and bending operation. The receptacle 42 is thrust with the shells 84, 90 onto the tubular carrier 20. Next, the two workpieces 42, 20 are placed in a reshaping tool, preferably an internal high-pressure-process tool 86 (FIG. 10). With the internal high-pressure process, various production steps can be combined, such as the forming on of wiper system receptacles 68, fastening elements on the body, and so forth.

Once the workpieces 42, 20 have been placed in the internal high-pressure-process tool 86, the tubular carrier 20 is acted upon by pressure, causing it and the shells 84, 90 to press against the inner wall 88 of the internal high-pressure-process tool 86, for example as a result of increasing the internal pressure via a pressure medium supply line 76. The inner wall 88 is preferably non round, so that a form lock can be created in the circumferential direction between the bed board and the tubular carrier 20. It is advantageous if the shells 84, 90 are preshaped in nonround fashion from the onset, to suit the inner wall 88. Preferably, they are preshaped to such an extent that a good form- and force-locking connection is created between them and the tubular carrier 20 by means of internal tensions, and at the same time there is no need to employ excessive forces because of material accumulation.

What is claimed is:

1. A wiper system, comprising a wiper motor (10) and a gear (12) that is secured via a receptacle (18, 38, 40, 42) to a tubular carrier (20) by fastening regions (16, 34, 36) formed onto a gearbox (14), the receptacle (18, 38, 40, 42) surrounding the tubular carrier (20) in a fashion selected from the group consisting of form-locking fashion, force-locking fashion and both, the tubular carrier (20) being placed form-lockingly in a direction selected from the group consisting of a longitudinal direction, a circumferential direction, and both into an indentation (24, 78) of the receptacle (18, 38), and a fastening region (34, 36) forming a part of the indentation (78).

2. The wiper system of claim 1, characterized in that the tubular carrier (20) is produced by an internal high-pressure process (IHV).

3. The wiper system of claim 1, with the tubular carrier (20) has a nonround form in the circumferential direction and/or a varying contour, dimension or orientation in the longitudinal direction (22).

4. The wiper system of claim 1, wherein the receptacle (18, 38, 40) is formed entirely or in part onto the gearbox (14).

5. The wiper system of claim 1, that a clip (26) that closes the indentation (24, 78) fixes the tubular carrier (20) in force-locking fashion.

6. The wiper system of claim 5, wherein the clip (26) fixes the tubular carrier (20) in form-locking fashion in the circumferential and/or the longitudinal direction (22).

7. A method for producing a connection selected from the group consisting of a form-locking connection, a force-locking connection, and both between a receptacle (42) and a tubular carrier (20), characterized in thrusting a still-round tubular carrier (20) into corresponding shells (84, 90) in a longitudinal direction (22);

placing the receptacle (42) and the tubular carrier (20) in an internal high-pressure-process toll (86); and pressing the tubular carrier (20) jointly with the shells (84, 90) against an inner wall (88) of an internal high-pressure-process toll (86).

8. A wiper system, comprising a wiper motor (10) and a gear (12) that is secured via a receptacle (18, 38, 40, 42) to a tubular carrier (20) by fastening regions (16, 34, 36) formed onto a gearbox (14), the receptacle (18, 38, 40, 42) surrounding the tubular carrier (20) in a fashion selected from the group consisting of form-locking fashion, force-locking fashion and both, the receptacle (18, 38, 40) being formed entirely or in part onto the gear box (14), at least on a foot (80) of a fastening region (34, 36), a receiving face (44) being formed on that corresponds to the outer contour of the tubular carrier (20); the fastening region (34, 36) reaching through the tubular carrier (20), and the tubular carrier being fixed force-locking on the gearbox (14) with a screw (32).

9. The wiper system of claim 8, wherein a reinforcing shell (82) is located between the screw (32) and the tubular carrier (20).

10. A wiper system, comprising a wiper motor (10) and a gear (12) that is secured via a receptacle (18, 38, 40, 42) to a tubular carrier (20) by fastening regions (16, 34, 36) formed onto a gearbox (14), the receptacle (18, 38, 40, 42) surrounding the tubular carrier (20) in a fashion selected from the group consisting of form-locking fashion, force-locking fashion and both, the tubular carrier (20) is placed form-lockingly in a direction selected from the group consisting of a longitudinal direction, a circumferential direction, and both into an indentation (24, 78) of the receptacle (18, 38), a clip (26) that closes the indentation (24, 78) fixes the tubular carrier (20) in force-locking fashion, the clip (26), on one side (28) of the tubular carrier (20) is suspended form-lockingly in the receptacle (18, 38) and is braced against the tubular carrier (20), and on the other side (20) is stayed with at least one screw (32).

* * * * *